United States Patent [19]
Kurtz

[11] 3,748,571
[45] July 24, 1973

[54] PRESSURE SENSITIVE TRANSDUCERS EMPLOYING CAPACITIVE AND RESISTIVE VARIATIONS

[75] Inventor: Anthony D. Kurtz, Englewood, N.J.

[73] Assignee: Kulite Semiconductors Products, Inc., Ridgefield, N.J.

[22] Filed: Sept. 7, 1972

[21] Appl. No.: 287,059

[52] U.S. Cl.................. 323/74, 317/256, 338/47, 323/93
[51] Int. Cl............................................. G05f 3/00
[58] Field of Search.................. 317/249, 256, 258; 338/13, 47, 99; 323/74, 93

[56] References Cited
UNITED STATES PATENTS

| 2,493,199 | 1/1950 | Khouri et al. | 323/74 |
| 2,907,320 | 10/1959 | De Weese et al. | 323/74 X |
| 3,219,915 | 11/1965 | Person | 323/74 |
| 3,200,326 | 8/1965 | Pritikin et al. | 323/74 |
| 3,274,483 | 9/1966 | Tetz | 323/74 |
| 3,426,267 | 2/1969 | Weller | 317/249 R X |
| 3,513,368 | 5/1970 | Boyer et al. | 317/256 |
| 3,715,638 | 2/1973 | Polye | 317/256 X |

Primary Examiner—William M. Shoop, Jr.
Attorney—Arthur L. Plevy

[57] ABSTRACT

There is disclosed a pressure transducer assembly which employs a flexible thin diaphragm. The diaphragm serves a dual purpose as a moveable plate of a capacitor and a support for a force responsive element. The force responsive element is coupled to the capacitor to form a composite circuit network, which network exhibits a dual impedance variation proportional to diaphragm deflection.

10 Claims, 11 Drawing Figures

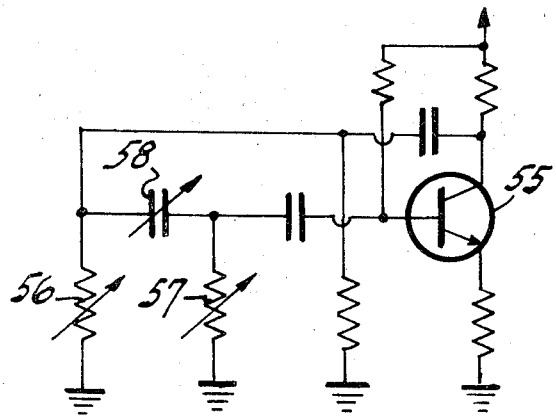
FIG. 5.
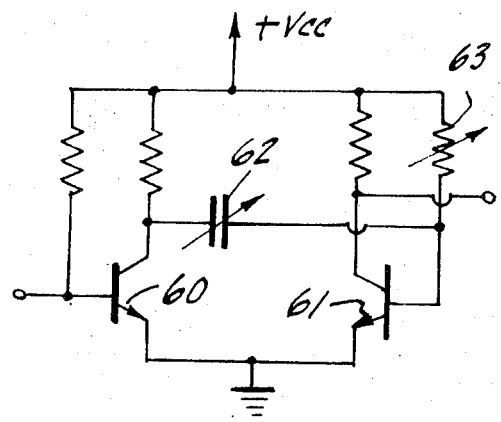
FIG. 6.
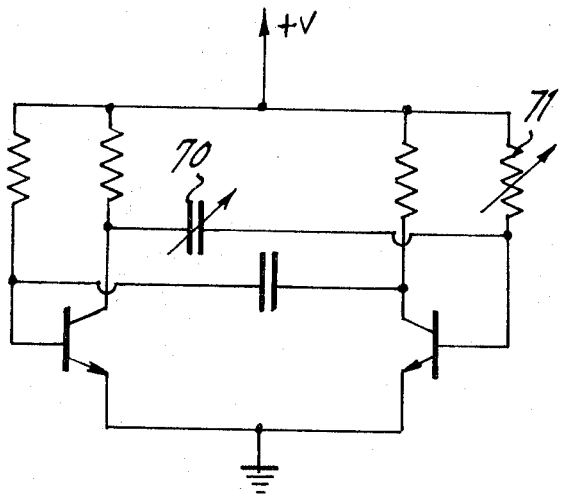
FIG. 7.
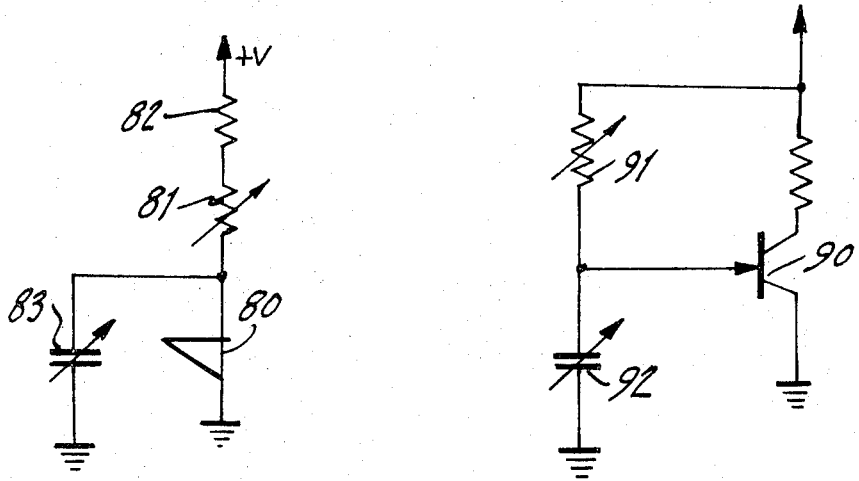
FIG. 8.
FIG. 9.

PRESSURE SENSITIVE TRANSDUCERS EMPLOYING CAPACITIVE AND RESISTIVE VARIATIONS

This invention relates to pressure transducers and more particularly to such transducers for measuring force or pressure by monitoring the varying characteristics of an associated network.

BACKGROUND OF INVENTION

The prior art includes a wide variety of devices which generally fall into the broad category of pressure transducers. As such, certain of these devices employ piezoresistive elements. These elements exhibit a change in resistance as a function of an applied pressure or force. Piezoresistive devices may be mounted on a diaphragm, which diaphragm will deflect upon application of a force thereto. The diaphragm can be fabricated from silicon or another semiconductor material and hence the elements can be fabricated on the diaphragm by conventional integrated circuit techniques.

Another class of pressure transducers employ a variation of capacity to determine the magnitude of an applied force. In essence, these devices operate to vary the effective capacity between a moveable plate and a stationary plate. The moveable plate can also be a flexible diaphragm which will deflect upon application of a suitable force in an amount proportionate to the force. The motion of the plate serves to vary the effective distance between this plate and the fixed plate. As is well known, the distance between two parallel plates determines the magnitude of the effective capacitance. In any event, both types of transducers have their particular utility and associated advantages and disadvantages. Capacitive type transducers are usually difficult to fabricate and are not necessarily compatible with conventional integrated circuit techniques. The piezoresistive type of transducer has difficulty in regard to high temperature operation and so on. These and other factors serve to limit the sensitivity of such transducers as well as the overall capability of responding to high frequency force variations.

It is, therefore, an object of the present invention to provide an improved pressure transducer compatible with integrated circuit manufacturing techniques and employing a dual effect to thereby afford greater sensitivity and response.

BRIEF DESCRIPTION OF PREFERRED EMBODIMENT

A pressure sensitive transducer comprises a thin semiconductor diaphragm capable of deflecting upon application of a force thereto, said diaphragm has a bottom surface, a portion of this surface is coated with a first conducting layer, the top surface including at least one force responsive element, which element exhibits an impedance change in response to deflection of the diaphragm; a cup-like housing has a central chamber with a bottom surface coated with a second conducting layer; the housing supports said diaphragm with the coated surface of the diaphragm facing the coated surface of the housing to thereby form a capacitor between said opposed layers, the value of said capacitance varying proportionately to the deflection of said diaphragm; and means coupling the force responsive element to one of said conductive layers to thereby obtain a dual variation both proportional to said deflection of said diaphragm.

BRIEF DESCRIPTION OF DRAWINGS

FIGS. 5 to 9 are circuit schematics of configurations in which the transducer assembly can be utilized.

DETAILED DESCRIPTION OF DRAWINGS

Figure 1:
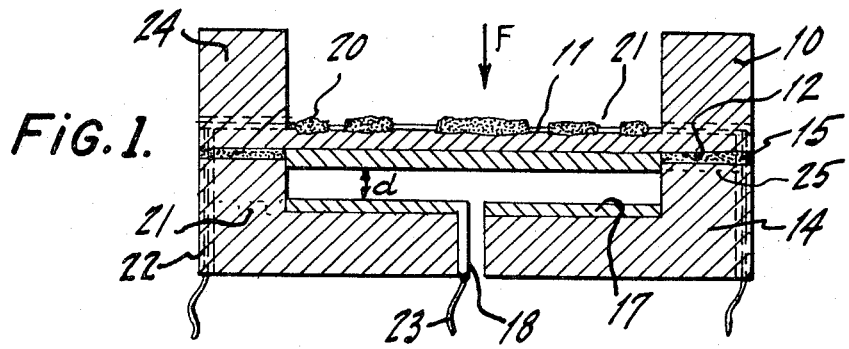
FIG. 1 is a cross-sectional view of a pressure transducer according to this invention.

Referring to FIG. 1 there is shown a cross section of a transducer according to this invention.

A cup of silicon or other material 14 is fabricated by the use of an etching or other technique. The cup 14 basically is an annular ring structure with a closed bottom end and an open top end. An aperture 18 is formed in the bottom surface by drilling or another operation. After forming the cup-like structure 14, a layer of metal 17, such as aluminum and so on is deposited upon the inner bottom surface of the cup 14. This metallic layer 17 acts as a fixed plate of a capacitor. A lead 23 from layer 17 may be brought through the aperture 18 as shown to eventually be connected in circuit. In any event, a terminal or lead arrangement may be directed through a slot 21 to a channel or wire containing slot 22 in a sidewall of member 14. Examples of techniques for directing conductors through such channels can be had be reference to U.S. Pat. No. 3,654,579 entitled ELECTROMECHANICAL TRANSDUCERS AND HOUSINGS and issued on Apr. 4, 1972 to A.D. Kurtz et al. and assigned to the same assignee herein.

A second annular cup 10 is bonded to the cup 14 by means of an epoxy bond 15 or an electrostatic technique. If the first cup 14 is a conductor, then the second cup 10 should be an insulator but if the first cup is an insulator, then the second cup may be either an insulator or conductor.

The cup 10 also has a closed bottom end and an open top end and basically the top sidewall 24 forms a rim about the relatively thin bottom surface 11.

This bottom surface 11 acts as a force responsive diaphragm and will deflect upon the application of force F thereto. The under surface of this diaphragm 11 is also coated with a metallic layer 12 which forms a moveable plate of the capacitor. As can be seen, the plates 12 and 17 are separated by the distance D. As is well known, a capacitor is formed by two parallel plates separated a given distance and containing a dielectric therebetween. In this instance, the dielectric is air. As is well known, the dielectric constant of air is 1.00 and the power factor is zero. This dielectric constant is relatively independent of temperature and hence air capacitors are widely used for critical tuning applications.

Essentially a capacitor is formed whenever an insulator (i.e., dielectric) separates two conductors between which a difference of potential can exist. A perfect capacitor when discharged gives up all the electric energy stored. Most of the loss in capacitors occurs in the dielectric although skin effect and other factors contribute as well. In the instance above, air entrapped within the hollow confines of the cup structure 14 acts as the dielectric. The aperture 18 is present to allow air to escape when a force F causes the diaphragm 11 to deflect. Since the absolute value of this capacitor arrangement is directly proportional to the dielectric constant and the plate area and inversely proportional to the distance D between plates 12 and 17, it can be seen that as D is reduced due to the application of a force to diaphragm 11, the value of the capacitor will increase. The amount of deflection is due to the magnitude of the applied force and hence the capacitance varies accordingly.

The diaphragm 11 can be fabricated from silicon, silicon being an excellent force collector or diaphragm as the Young's modulus of silicon is comparable to that of steel and the density is comparable to that of aluminum. This determines a high natural frequency for a silicon diaphragm and therefore an excellent ability for the structure to respond to high frequency force phenomena. However, other materials which are also excellent force collectors such as a quartz may be used.

Leads for the moveable plate 12 are also directed through apertures or otherwise so that one has two terminals or lead wires for the two plates 12 and 17 of the capacitor.

As such, the leads for moveable plate may also be directed through apertures 25 and hence through channels and so on.

As above indicated, a variable capacitor is formed between plates 12 and 17 which variation of capacitance magnitude is directly proportional to the magnitude of the applied force F to diaphragm 11. In this manner as the intensity of the force increases, the value of the capacitance increases because the distance D between the plates decreases. This principle is, of course, well known and many acousitc microphones and transducers operate accordingly.

As indicated, the cup or annular structure 10 is fabricated from silicon to thereby provide an efficient diaphragm action. Since silicon is also a semiconductor, the diaphragm 11 can have diffused thereon or deposited upon the top surface thereof one or more resistive elements as 20 and 21. As will be further explained, the resistances 20 and 21 may be piezoresistive devices and hence be force responsive elements and therefore also serve to vary impedance as a function of diaphragm deflection.

The elements 20 and 21 may be atomically bonded by conventional semiconductor techniques to the appropriate surface of the diaphragm 11. Such techniques may involve solid state diffusion methods or epitaxial growth procedures. Each of the stress sensors or piezoresistive elements 20 and 21 are conventionally isolated from the diaphragm 11, acting as a substrate, by a P-N junction or by a insulating layer.

Depending upon the location of these piezoresistive elements 20 and 21 on the surface of the diaphragm 11, they can be either in compression or tension due to the deflection of the diaphragm by the external force F.

Briefly, at the center of the diaphragm both radical and tangential stresses are equal in sign and magnitude, while at the periphery they are not of the same magnitude but are of the sign of opposite that of the center.

The resistance of the piezoresistive element varies primarily as a result of the change in bulk resistance of the material rather than a change in geometry.

With cognizance of the directionality of the piezoresistive effect and proper placement of resistors 20 and 21 on the diaphragm, their value will increase as deflection increases. The resistors 20 and 21 can have separate contacts or terminals or be directly connected to one of the plates 12 or 17 to thereby form an RC network. In this network, both the resistance and capacitance varies according to diaphragm deflection. This, therefore, provides a dual effect resulting in a substantial increase in pressure or force response for the transducer.

Figure 2:
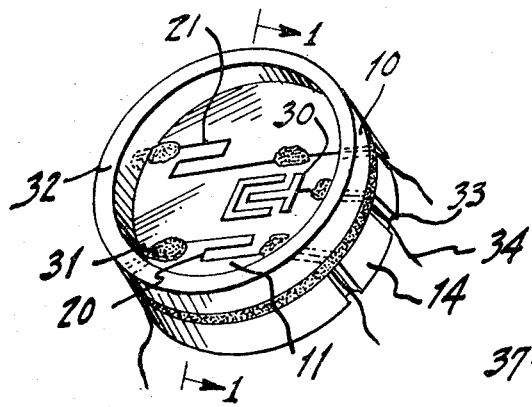
FIG. 2 is a perspective view of the transducer assembly shown in FIG. 1.

FIG. 2 shows a perspective view of the transducer assembly of FIG. 1. The piezoresistors 20 and 21 are located on the surface of diaphragm 11. As located, they are subjected to tension according to deflection and hence their resistance increases as the diaphragm deflects. One terminal of each resistor can be preconnected to a plate of the capacitor formed according to the desire of the designer. In this manner, one could achieve a plurality of different RC configurations to be used in a number of different circuit configurations.

Alternatively for greater circuit flexibility, all leads can be brough out via wire accommodating channels as 34 to be connected in circuit at the option of the user.

Also shown located on the surface of the diaphragm 11 is an integrated circuit transistor 30. To integrate, diffuse or otherwise form a transistor on a diaphragm of silicon as is well known. The transistor 30 can be so grown and its emitter, base and collector electrodes can be brought out to a suitable terminal assembly or directly connected on silicon substrate to one or more of the resistive elements 20 and 21. This again being under the control or the desire of the user of the transducer.

Figure 3A:
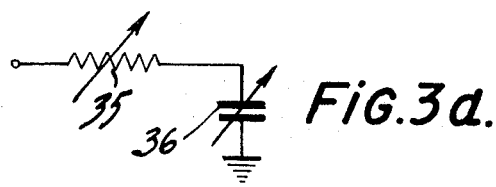
FIGS. 3A to 3C are equivalent circuit diagrams of the transducer according to this invention.
Figure 3B:
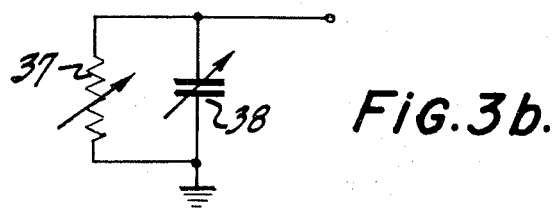
Figure 3C:
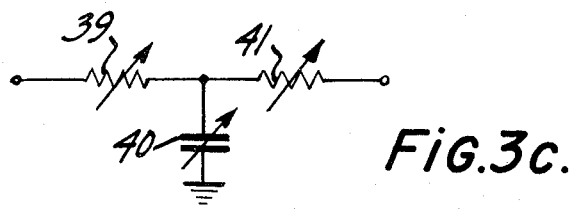

Referring to FIGS. 3A–3C, there are shown some representative circuit configurations which can be easily implemented according to the structure and nature of the above-described transducer.

FIG. 3A shows a series connected piezoresistive element 35 having one terminal connected to a plate of the transducer capacitor 36. The other terminal of the resistor is not connected in circuit while the other plate of capacitor 36 is shown connected to a point of reference potential. The configuration indicates that both resistor 35 and capacitor 36 are variable according to deflection and form a well known low pass filter configuration. Alternatively if resistor 35 were replaced with capacitor 36 and vice versa, a high pass arrangement would be available.

FIG. 3B shows a piezoresistor 37 in shunt with capacitor 38. Here both terminals of the elements are connected together on the substrate to form a parallel R-C network having each component variable.

FIG. 3C shows two piezoresistive elements 39 and 41 arranged in a "Tee" filter configuration with the dual plate capacitor 40. All elements are thusly variable.

Basically, the time constant of a R-C network is directly proportional to the magnitude of resistance multiplied by the value of the capacitance. The frequency afforded by these components is the reciprocal of the time constant. Hence, if both the capacitance increases and the resistance increases as a function of diaphragm deflection, the frequency of the R-C configuration will decrease accordingly. Depending upon the circuit configuration employing the components, this factor can be conveniently used to provide a plurality of useful circuit configurations.

Figure 4:
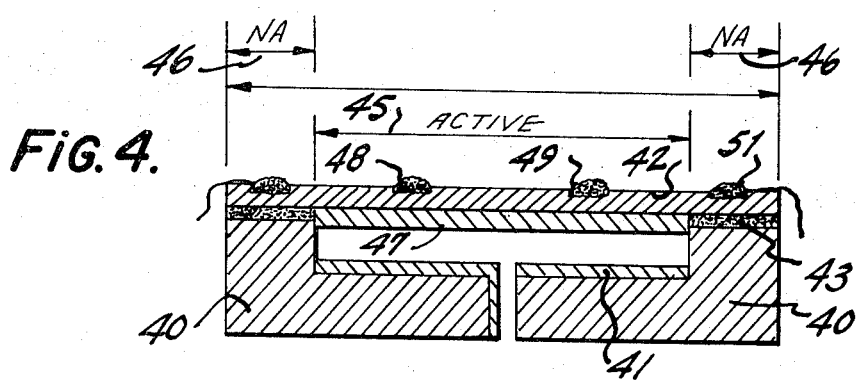
FIG. 4 is a cross-sectional view of an alternate transducer assembly according to this invention.

FIG. 4 shows a cross section of an alternate transducer. Briefly, a cup or annular structure 40 is formed with a metallic layer 41 on the bottom surface to represent the fixed plate of a capacitor. A silicon wafer or diaphragm 42 is bonded to the top opening of the cup 40 by means of a suitable bond 43. A metallic layer, forming the moveable plate 47, may be deposited on the underside of diaphragm 42. If silicon is used, one may eliminate the metallic plate and use the silicon as the moveable plte. The area 45 plate. an active area of the diaphragm 42 while the peripheral portions or outside area 46 forms a non-active area. The active area 45 deflects most readily upon application of a force thereto, while 46 does not.

In this manner, one or more piezoresistive elements 48 and 49 are located on the active area of the diaphragm 42 and will vary resistance according to deflection. Also shown are additional components 50 and 51 located on the non-active area. These components can also be deposited thereon by integrated circuit techniques and will not respond nor vary for deflection or pressure applied to the diaphragm. The elements 50 and 51 can therefore be conventional integrated resistors. In this manner, the values would not vary according to pressure. Similarly, the components 50 and 51 can be transistors or other active elements. As such, one can purchase an integrated circuit chip and the chip as 50 and 51 can be glued of otherwise fastened to the non-active area 46 of the diaphragm. The components or circuits 50 and 51 would not be subjected to pressure or diaphragm deflection.

It is, of course, realized that a plurality of such components 50 and 51 could be so deposited or fastened to the non-active area 46 of the assembly, limited only by size and effective area of the non-active portion. Thus, the active circuit elements can be placed in close proximity to the stress sensitive elements, this fact being of great importance in the fabrication of transducers of small size since the amount of parasitic capacitance due to the leads is reduced, eliminating noise pickup and effectively increasing the sensitivity of the transducers.

FIG. 5 to 9 shows examples of typical circuit configurations wherein the above transducer assembly will be useful. These figures are by way of example only and many additional uses and configurations will become obvious to those skilled in the art.

FIG. 5 shows a typical resistance capacitance oscillator or phase shift oscillator. This circuit employs a transistor 55 with feedback from collector to base via R-C networks, each providing at least 60° phase shift at the frequency of the oscillator. Oscillation will occur at the frequency of the 180° phase shift, provided the gain of the transistor amplifier 55 is greater than the attenuation of the R-C networks.

Here resistors 56 and 57 are piezoresistive elements and capacitor 58 is also pressure sensitive. Hence, the frequency varies as a function of diaphragm pressure and this signal can be used in a variety of pressure monitoring applications.

FIG. 6 shows a free running multivibrator configuration employing two transistors 60 and 61, which are located on the non-active portion of the diaphragm (as 46 of FIG. 4). Coupling is afforded between collector and base via a pressure variable capacitor 62. Resistor 63 also determinative of frequency is also variable and may be a piezoresistive element to afford greater circuit flexibility and larger variation in frequency with pressure change.

FIG. 7 shows an astable multivibrator configuration employing a pressure sensitive capacitor 70 and a pressure sensitive resistor 71. As these elements vary, the frequency and pulse width of the output of the multivibrator varies, thus providing a variable pulse width modulated signal. It is noted that the entire configuration can be completely incorporated in the assembly shown in FIGS. 1, 2 and 4.

FIG. 8 shows a sawtooth oscillator employing a four layer diode 80 as a capacitor discharge element. The four layer diode 80 is a conventional semiconductor device that exhibits a negative resistance when the voltage across its terminals exceeds a breakdown voltage. In this manner, the diode 80 has its anode coupled to a source of potential V, via a piezoresistor 81 and a fixed resistor 82. A pressure sensitive dual plate capacitor 83 is a shunt with the diode. The configuration will free-run at a frequency determined by the quiescent values of resistors 81 and 82 and capacitor 83. As the diaphragm of the composite transducer assembly is deflecte by pressure, resistor 81 and capacitor 83 vary as does the frequency of the sawtooth across diode 80. Therefore, the sawtooth provided is varied according to diaphragm deflection and the effect on frequency is two-fold according to both the resistor 81 and capacitor 83 variation.

FIG. 9 shows another typical free running oscillator configuration employing a unijunction transistor of double based diode 90.

The frequency of oscillation is determined by resistor 91 and capacitor 92, both being those components capable of varying according to pressure. Hence the output from the emitter of unijunction 90 varies according to pressure.

In summation, there has been provided unique pressure transducers which employ both resistive and capacitive element which can vary according to pressure, thereby affording increased sensitivity to pressure. The units further are adapted for inclusion of active devices as transistors and so on, and non-variable circuit components, present on non-active portions of the assembly to enable complete circuit configurations to be employed to monitor or indicate pressure and force. The units can be fabricated from conventional integrated circuit techniques as the assembly is fabricated entirely from semiconductor materials.

Numerous other applications of such transducers should be readily apparent to those skilled in the art and all are deemed to be within the scope and breath of the following claims.

I claim:

1: An electromechanical transducer for responding to the magnitude of an applied force comprising:
 a. a relatively thin diaphragm capable of deflecting upon application of a force thereto,
 b. a first metallic layer located on at least a portion of a bottom surface of said diaphragm,
 c. an annular housing member having a closed bottom end and an opened top end, with said surface of said bottom end facing said open top having a second metallic layer located thereon,
 d. means for mounting said diaphragm over said open top end of said annular housing member with said first metallic layer facing said second metallic layer, whereby any deflection of said diaphragm varies the distance between said layers and therefore the capacitance, e. at least one force responsive element mounted on the top surface of said diaphragm and coupled to one of said metallic layers to provide an additional variation upon deflection of said diaphragm, and f. means connecting said force responsive element and said metallic layer in circuit.

2: The transducer according to claim 1 wherein said diaphragm is fabricated from a semiconductor material and said force responsive element is a piezoresistive element diffused into said diaphragm.

3: The transducer according to claim 2 further including at least one transistor diffused into said diaphragm, said transistor having a base, collector and emitter electrodes with at least one of said electrodes coupled to said piezoresistive element.

4: A pressure transducer, comprising:

a. a thin semiconductor diaphragm capable of deflecting upon application of a force thereto, said diaphragm having a bottom surface a portion of which is coated with a first conducting layer and a top surface including at least one force responsive element which element exhibits an impedance change in response to deflection of said diaphragm, b. a cup-like housing having a central chamber with a bottom surface coated with a second conducting layer, said housing for supporting said diaphragm with said coated surface facing said coated surface of said housing, to thereby form a capacitor between said opposed layers, whereby said value of capacitance varies proportionately to said deflection of said diaphragm, and c. means coupling said force responsive element to one of said conducting layers to thereby obtain a dual variation both proportional to said deflection of said diaphragm.

5: In a pressure sensitive capacitor transducer of the type having a fixed plate and a diaphragm, said diaphragm serving as a moveable plate in spaced relation with said fixed plate, said diaphragm fabricated from a semiconductor material in combination therewith, a. an electrically conductive layer located on a surface of said diaphragm to form said moveable plate, whereby when said diaphragm deflects, the distance between said fixed plate and said layer varies as does said capacity, and b. at least one piezoresistive element located on the top surface of said diaphragm and positioned to increase its resistance when said distance between said fixed plate and said layer decreases.

6: The pressure transducer according to claim 5 further comprising:

a. circuit means coupling said piezoresistive element to one of said plates to provide an output signal manifesting the variation of said capacitance and said resistance.

7: A pressure sensitive circuit network, comprising:

a. a relatively thin diaphragm of a semiconductor material having located on a portion of a bottom surface a layer of a conductive material, and having diffused on a top surface thereof at least one piezoresistive element, said diaphragm capable of deflecting upon application of a force thereto, b. an annular housing having an open top end and a closed bottom end with a portion of the surface of said bottom end facing said top end coated with a conductive material to form a fixed plate of a capacitor, c. means for mounting said diaphragm over said end of said housing with said layers facing each other whereby said layer associated with said diaphragm forms a moveable plate of said capacitor, and d. means coupling said piezoresistive element to one of said plates to form a resistor-capacitor network, each component of which varies according to the magnitude of a force applied to said diaphragm.

8: The pressure sensitive circuit network according to claim 7 wherein said thin diaphragm of semiconductor material is fabricated from silicon.

9: The pressure sensitive circuit network according to claim 7 further comprising:

a. at least one transistor device mounted on said thin diaphragm and having a base, collector and emitter electrode and means coupling at least one of said electrodes to said resistor-capacitor network.

10: The apparatus according to claim 7 wherein said conductive material is metal.

* * * * *